March 8, 1927.  
O. C. HARPER  
AUTOMOBILE BED  
Filed Feb. 14, 1925
1,620,346
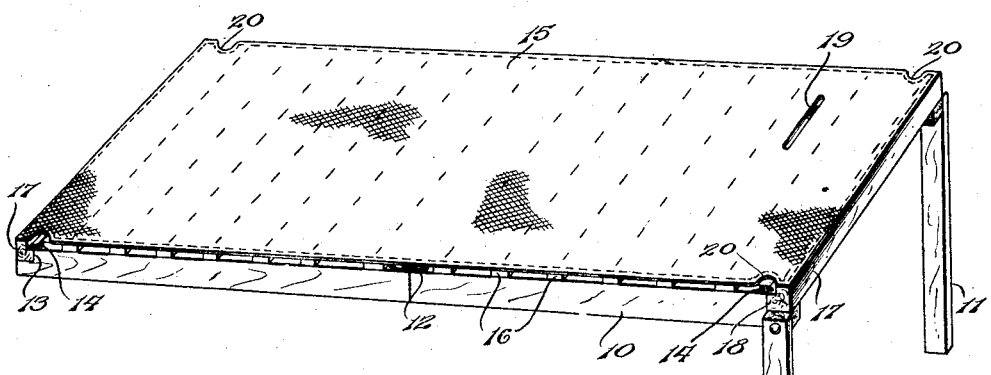
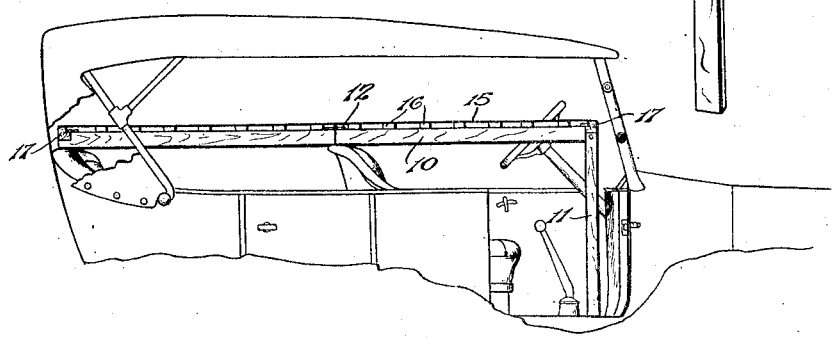
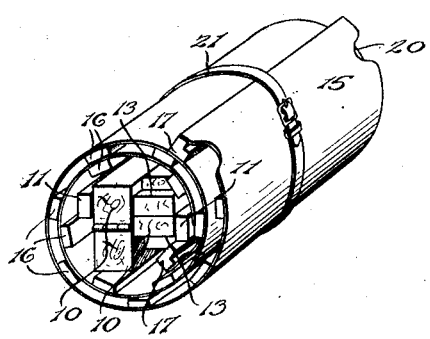
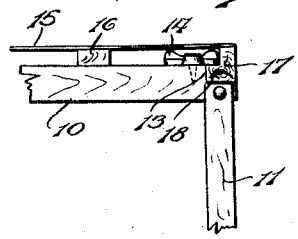
Inventor
O. C. Harper
By *Lacey & Lacey*, Attorneys Patented Mar. 8, 1927.

1,620,346

UNITED STATES PATENT OFFICE.

OSWALD CHARLES HARPER, OF SASKATOON, SASKATCHEWAN, CANADA.

AUTOMOBILE BED.

Application filed February 14, 1925. Serial No. 9,174.

This invention relates to an improved folding bed for motor vehicles and seeks, among other objects, to provide a bed which may be easily and quickly set up in an automobile to afford comfortable sleep to the occupant or occupants of the car.

The invention seeks, as a further object, to provide a bed which will be composed of few and simple parts and which will be well adapted for use in connection with the various makes of automobiles as now on the market.

And the invention seeks, as a still further object, to provide a bed which may be compactly folded so as to be readily transported when not in use.

Other and incidental objects will appear hereinafter.

In the accompanying drawings:

Figure 1 is a perspective view of the bed.

Figure 2 is a side elevation showing the bed set up in a conventional motor vehicle.

Figure 3 is a detail elevation showing the mounting of the end rails of the bed frame.

Figure 4 is a perspective view showing the bed folded.

In carrying the invention into effect, I employ a bed frame which comprises a pair of separate side rails 10, to corresponding ends of which are pivoted a pair of legs 11 disposed at the outer sides of said rails. The side rails as well as the legs may be formed of wood and, as will be observed, said side rails are each composed of a pair of companion front and rear sections connected, as shown in Figure 1 of the drawings, by a hinge 12 lying against the upper edges of the sections, the sections being of substantially equal length. Formed in the side rails, at the ends thereof, are notches 13 and rotatably mounted upon the upper edges of said side rails, at the inner ends of said notches, are buttons 14 which may be turned to overhang said notches. It is now to be observed that each of the side rails with its attached leg constitutes a separate unit.

In conjunction with the bed frame, I provide a bed bottom 15 which includes a strip of canvas or the like, and secured to the lower side of said strip is a plurality of parallel cross slats 16 connected to the strip by suitable staples or other appropriate fastenings. Similarly connected to the ends of the strip 15 are end bars 17 which, as particularly shown in Figure 3, are angle-shaped in cross section and are thus provided at their inner sides with flanges 18. The cross slats and said bars are equally spaced from end to end of the strip and, as shown in Figure 1, are of a length to extend between the side rails of the bed frame, resting at their ends upon said rails, while the end bars 17 are shaped to fit in the notches 13, the flanges 18 of the end bars being of a thickness to lie flush with the upper edges of the rails. Preferably, the slats as well as the end bars are of wood and while said slats are sufficiently rigid to support the weight of a person or persons lying on the bed, these slats will, nevertheless, flex more or less freely to impart a spring effect to the bed bottom. Formed in the canvas strip near its forward end is an oblong opening 19 extending transversely of the strip and formed in the opposite edges of the strip, near its ends, are notches 20.

In Figure 2 of the drawings, I have shown the improved bed in position in a conventional automobile. In setting up the bed, first one and then the other of the side rail and leg units is arranged in place. The sections of each side rail are swung into alinement, when the rear ends of said rails are rested upon the upper edge of the back of the rear seat of the vehicle while the legs 11 are swung downwardly to rest upon the floor of the vehicle at the front thereof, for supporting the forward ends of the rails. The rails 10 thus extend across the front seat of the vehicle and, as will be observed, the meeting ends of the sections of said rails rest upon the upper edge of the back of the front seat so that the rail sections are thus rigidly supported in alinement. The bed bottom is then disposed upon the rails 10 and the end bars 17 of the bottom fitted in the notches 13, when the buttons 14 are turned to engage over the flanges 18 of said bars for securing the end bars in position. The bed frame may thus be readily set up and, in this connection, it is to be observed that the notches 20 in the edges of the strip 15 afford ready access to said buttons. The legs 11 are disposed to abut the sides of the vehicle body or, in the event the vehicle is provided with forward doors, as illustrated in the drawings, said legs are disposed to abut said doors so that the legs will thus be braced and the rails 10 accordingly prevented from swinging apart at their forward ends. Furthermore, the side rails will frictionally coact with the upper edges of the backs of the front and rear seats of the vehicle to prevent the spreading of the rails and, as shown in Figure 2, the opening 19 in the strip 15 is disposed to receive the upper portion of the vehicle steering wheel therethrough so that the bed bottom will lie flat upon said rails. A convenient bed is thus provided.

As will be at once understood in view of the foregoing, the bed may, after use, be readily removed from the vehicle, when the legs 11 may be swung to lie along the side rails 10 and the sections of the side rails folded into overlapping relation. The bed bottom may then, as shown in Figure 4, be wrapped around the parts to provide a neat and compact bundle. Preferably, a securing strap 21 is provided to encircle the bundle so that the folded bed may be readily transported.

Having thus described the invention, what I claim is:

An automobile bed including side rails having notches in their ends, a fabric strip, cross slats extending transversely beneath said strip and secured against the under face of the strip in spaced relation to each other and resting at their ends upon the upper edge faces of said side rails, end bars secured to the ends of the fabric strip transversely thereof and at their ends resting in the notches of the side rails, said bars having their outer strip engaging portions extending above the side rails and their inner portions flush with the upper edges of the side rails, and fasteners carried by said side rails and movable into position to overlie the inner portions of the end bars and releasably secure the end bars, the corner portions of said fabric strip being recessed above the fasteners to permit access to the fasteners.

In testimony whereof I affix my signature.

OSWALD CHARLES HARPER. [L. S.]